United States Patent
Lin

(10) Patent No.: US 12,306,810 B2
(45) Date of Patent: May 20, 2025

(54) SYSTEMS AND METHODS FOR DISTRIBUTED VERSION RECLAIM

(71) Applicant: Kinaxis Inc., Ottawa (CA)

(72) Inventor: Angela Lin, Ottawa (CA)

(73) Assignee: Kinaxis Inc.

( * ) Notice: Subject to any disclaimer, the term of this patent is extended or adjusted under 35 U.S.C. 154(b) by 45 days.

(21) Appl. No.: 18/175,590

(22) Filed: Feb. 28, 2023

(65) Prior Publication Data

US 2023/0281175 A1 Sep. 7, 2023

Related U.S. Application Data

(60) Provisional application No. 63/315,268, filed on Mar. 1, 2022.

(51) Int. Cl.
*G06F 16/00* (2019.01)
*G06F 16/21* (2019.01)
*G06F 16/215* (2019.01)

(52) U.S. Cl.
CPC .......... *G06F 16/215* (2019.01); *G06F 16/219* (2019.01)

(58) Field of Classification Search
None
See application file for complete search history.

(56) References Cited

U.S. PATENT DOCUMENTS

| | | | |
|---|---|---|---|
| 6,449,734 B1 | 9/2002 | Shrivastava et al. | |
| 7,567,986 B2* | 7/2009 | Pudipeddi | G06F 9/52 |
| 7,698,348 B2* | 4/2010 | Walker | G06F 16/24552 |
| | | | 707/790 |
| 9,292,573 B2* | 3/2016 | Walker | G06F 16/24552 |
| 9,507,843 B1* | 11/2016 | Madhavarapu | G06F 16/2358 |
| 10,013,318 B2* | 7/2018 | Block | G06F 11/2002 |
| 10,671,576 B2* | 6/2020 | Douros | G06F 16/2343 |
| 2006/0080367 A1* | 4/2006 | Pudipeddi | G06F 9/466 |
| 2010/0005124 A1* | 1/2010 | Wagner | G06F 16/27 |
| | | | 707/E17.007 |
| 2010/0223430 A1* | 9/2010 | Walker | G06F 16/24552 |
| | | | 711/E12.017 |
| 2016/0034361 A1* | 2/2016 | Block | H04L 41/065 |
| | | | 714/4.12 |
| 2017/0011074 A1* | 1/2017 | Douros | G06F 16/2379 |
| 2020/0012659 A1* | 1/2020 | Dageville | G06F 16/245 |
| 2023/0101740 A1* | 3/2023 | Beier | G06F 16/27 |
| | | | 707/610 |
| 2023/0107071 A1* | 4/2023 | Lin | G06F 16/2379 |
| | | | 707/615 |
| 2023/0185676 A1* | 6/2023 | Park | G06F 11/1474 |
| | | | 707/674 |

* cited by examiner

*Primary Examiner* — Farhan M Syed
(74) *Attorney, Agent, or Firm* — Borden Ladner Gervais

(57) ABSTRACT

Systems and methods comprising: sending, by one or more database nodes, a release event for each database node for a version to an event log, where the database node no longer needs the version; continuously consuming, by a version reclaim-leader, the one or more release events from the event log; determining, by the version reclaim-leader, whether a version has been released by all database nodes; generating, by the version reclaim-leader, one or more cleanup transactions for the version; committing, by the version reclaim-leader, the one or more cleanup transactions to a transaction log; continuously replicating, by each database node, the one or more cleanup transactions from the transaction log; and applying, by each database node, the one or more cleanup transactions for the version.

12 Claims, 15 Drawing Sheets

SYSTEMS AND METHODS FOR DISTRIBUTED VERSION RECLAIM

This application claims priority of U.S. Ser. No. 63/315,268 filed Mar. 1, 2022, the disclosure of which is hereby incorporated by reference in its entirety.

BACKGROUND

In a non-clustered database, reference counting is used to determine when a version is free to be reclaimed. However, in a database cluster, reference counting becomes complicated when determining when a version can be reclaimed. There is a need to enable version reclaim (VR) in a database cluster.

BRIEF SUMMARY

Systems and methods disclosed herein extend reference count management so that it can be determined when a version is free on all database nodes in a database cluster. That is, systems and methods disclosed herein enable version reclaim in a database cluster.

Systems and methods disclosed herein also replicate version reclaim cleanup to all database nodes using transaction replication.

Systems and methods disclosed herein enable version reclaim in a clustered system. These ensure that the database—especially a version graph—remains correct and consistent on all database nodes in a cluster. Such systems and methods avoid attempting to reclaim versions that are still in use by any member of the cluster. Version reclaim is performed efficiently by: avoiding duplication of version reclaim effort; avoiding generating version reclaim cleanup transactions that are invalid (i.e., reclaiming versions that are still in use); and minimizing inter-database node communication. Furthermore, systems and methods disclosed herein are resilient to inter-database node communication failure.

Systems and methods disclosed herein may comprise the following: a database cluster; a database node; multiple copies of a version; a Version Reclaim-Leader (VR-Leader); an event log; a release event; a Transaction Log; and a MemberJoin Transaction Log Entry.

In one aspect, a computer-implemented method is provided for distributed version reclaim in a database cluster includes a plurality of database nodes. The method includes: sending, by each database node that no longer needs a respective version, a release event to an event log, thereby producing a plurality of release events in the event log, the release event including a version number of the respective version and a database node identifier of the respective database node; continuously consuming, by a version reclaim-leader, the plurality of release events from the event log; determining, by the version reclaim-leader, whether a version has been released by each database node of the plurality of database nodes; generating, by the version reclaim-leader, one or more cleanup transactions for the version when the version reclaim-leader determines that the version has been released by each database node; committing, by the version reclaim-leader, the one or more cleanup transactions to a transaction log; continuously replicating, by each database node, the one or more cleanup transactions from the transaction log; and applying, by each database node, the one or more cleanup transactions for the version.

In the computer-implemented method, determining that the database node no longer needs the respective version may include decreasing, by the database node, a reference count for the respective version until the reference count reaches a minimum threshold.

In the computer-implemented method, continuously consuming the plurality of release events by the version reclaim-leader may include: obtaining, by the version reclaim-leader, an unprocessed event from the event log; and obtaining, by the version reclaim-leader, the respective version from a payload of the unprocessed event.

In the computer-implemented method, determining whether the version has been released by each database node of the plurality of database nodes may include: obtaining, by the version reclaim-leader, a set of database nodes associated with the version from a received events map; and determining, by the version reclaim-leader, if the set of database nodes contains every database node in a cluster node list. The computer-implemented method may also include determining, by the version reclaim-leader, that the version has been released by each database node when the set of database nodes contains every database node in a cluster node list. The computer-implemented method may also include: determining, by the version reclaim-leader, that the version has not been released by each database node when the set of database nodes does not contain every database node in the cluster node list, followed by; updating, by the version reclaim-leader, the received events map. Other technical features may be readily apparent to one skilled in the art from the following figures, descriptions, and claims.

In one aspect, a computer-implemented method includes: signaling, by a database node to a version reclaim-leader, a departure of the database node from a cluster; removing, by the version reclaim-leader, the database node from a received events map and a cluster node list; determining, by the version reclaim-leader, one or more reclaimed versions; generating, by the version reclaim-leader, one or more cleanup transactions for the one or more reclaimed versions; committing, by the version reclaim-leader, the one or more cleanup transactions to a transaction log; and replicating, by one or more remaining database nodes in the cluster, the one or more cleanup transactions.

In one aspect, a computer-implemented method includes: signaling, by a database node to a version reclaim-leader, a request to join a cluster; disabling, by the database node, a query execution; adding, by the version reclaim-leader, the database node to a received events map and a cluster node list; committing, by the version reclaim-leader, a memberjoin transaction for the database node to a transaction log; and replicating, by the database node, up to the member-join transaction. The computer-implemented method also includes enabling, by the database node, the query execution.

In one aspect, a system for distributed version reclaim in a database cluster includes a plurality of database nodes. The system includes a processor. The system also includes a memory storing instructions that, when executed by the processor, configure the system to: send, by each database node that no longer needs a respective version, a release event to an event log, thereby producing a plurality of release events in the event log, the release event including a version number of the respective version and a database node identifier of the respective database node; continuously consume, by a version reclaim-leader, the plurality of release events from the event log; determine, by the version reclaim-leader, whether a version has been released by each database node of the plurality of database nodes; generate, by the version reclaim-leader, one or more cleanup transactions for the version when the version reclaim-leader determines that the version has been released by each database node; commit, by the version reclaim-leader, the one or more cleanup transactions to a transaction log; continuously replicate, by each database node, the one or more cleanup transactions from the transaction log; and apply, by each database node, the one or more cleanup transactions for the version.

The system may also be configured to, when determining that the database node no longer needs the respective version, decrease, by the database node, a reference count for the respective version until the reference count reaches a minimum threshold.

The system may also, when continuously consuming the plurality of release events by the version reclaim-leader be further configured to: obtain, by the version reclaim-leader, an unprocessed event from the event log; and obtain, by the version reclaim-leader, the version from a payload of the unprocessed event.

The system may also, when determining whether the version has been released by each database node of the plurality of database nodes be further configured to: obtain, by the version reclaim-leader, a set of database nodes associated with the version from a received events map, and determine, by the version reclaim-leader, if the set of database nodes contains every database node in a cluster node list. The system may also be further configured to determine, by the version reclaim-leader, that the version has been released by each database node when the set of database nodes contains every database node in a cluster node list. The system may also be further configured to determine, by the version reclaim-leader, that the version has not been released by each database node when the set of database nodes does not contain every database node in the cluster node list, and update, by the version reclaim-leader, the received events map. Other technical features may be readily apparent to one skilled in the art from the following figures, descriptions, and claims.

In one aspect, a system includes a processor. The system also includes a memory storing instructions that, when executed by the processor, configure the system to: signal, by a database node to a version reclaim-leader, a departure of the database node from a cluster; remove, by the version reclaim-leader, the database node from a received events map and a cluster node list; determine, by the version reclaim-leader, one or more reclaimed versions; generate, by the version reclaim-leader, one or more cleanup transactions for the one or more reclaimed versions; commit, by the version reclaim-leader, the one or more cleanup transactions to a transaction log; and replicate, by one or more remaining database nodes in the cluster, the one or more cleanup transactions.

In one aspect, a system includes a processor. The system also includes a memory storing instructions that, when executed by the processor, configure the system to: signal, by a database node to a version reclaim-leader, a request to join a cluster; disable, by the database node, a query execution; add, by the version reclaim-leader, the database node to a received events map and a cluster node list; commit, by the version reclaim-leader, a member-join transaction for the database node to a transaction log; and replicate, by the database node, up to the member-join transaction. The system may also be configured to enable, by the database node, the query execution.

In one aspect, a non-transitory computer-readable storage medium is provided for distributed version reclaim in a database cluster includes a plurality of database nodes. The computer-readable storage medium includes instructions that when executed by a computer, cause the computer to: send, by each database node that no longer needs a respective version, a release event to an event log, thereby producing a plurality of release events in the event log, the release event including a version number of the respective version and a database node identifier of the respective database node; continuously consume, by a version reclaim-leader, the plurality of release events from the event log; determine, by the version reclaim-leader, whether a version has been released by each database node of the plurality of database nodes; generate, by the version reclaim-leader, one or more cleanup transactions for the version when the version reclaim-leader determines that the version has been released by each database node; commit, by the version reclaim-leader, the one or more cleanup transactions to a transaction log; continuously replicate, by each database node, the one or more cleanup transactions from the transaction log; and apply, by each database node, the one or more cleanup transactions for the version.

The non-transitory computer-readable storage medium may also, when determining that the database node no longer needs the respective version, include instructions that when executed by the computer, further cause the computer to decrease, by the database node, a reference count for the respective version until the reference count reaches a minimum threshold.

The non-transitory computer-readable storage medium may also, when continuously consuming the plurality of release events by the version reclaim-leader, include instructions that when executed by the computer, further cause the computer to obtain, by the version reclaim-leader, an unprocessed event from the event log, and obtain, by the version reclaim-leader, the version from a payload of the unprocessed event.

The non-transitory computer-readable storage medium, when determining whether the version has been released by each database node of the plurality of database nodes, may also include instructions that when executed by the computer, further cause the computer to obtain, by the version reclaim-leader, a set of database nodes associated with the version from a received events map, and determine, by the version reclaim-leader, if the set of database nodes contains every database node in a cluster node list. The non-transitory computer-readable storage medium may also include instructions that when executed by the computer, further cause the computer to determine, by the version reclaim-leader, that the version has been released by each database node when the set of database nodes contains every database node in a cluster node list. The non-transitory computer-readable storage medium may also include instructions that when executed by the computer, further cause the computer to determine, by the version reclaim-leader, that the version has not been released by each database node when the set of database nodes does not contain every database node in the cluster node list, and update, by the version reclaim-leader, the received events map. Other technical features may be readily apparent to one skilled in the art from the following figures, descriptions, and claims.

In one aspect, a non-transitory computer-readable storage medium is provided. The computer-readable storage medium includes instructions that when executed by a computer, cause the computer to: signal, by a database node to a version reclaim-leader, a departure of the database node from a cluster; remove, by the version reclaim-leader, the database node from a received events map and a cluster node list; determine, by the version reclaim-leader, one or more reclaimed versions; generate, by the version reclaim-leader, one or more cleanup transactions for the one or more reclaimed versions; commit, by the version reclaim-leader, the one or more cleanup transactions to a transaction log; and replicate, by one or more remaining database nodes in the cluster, the one or more cleanup transactions.

In one aspect, a non-transitory computer-readable storage medium is provided. The computer-readable storage medium includes instructions that when executed by a computer, cause the computer to: signal, by a database node to a version reclaim-leader, a request to join a cluster; disable, by the database node, a query execution; add, by the version reclaim-leader, the database node to a received events map and a cluster node list; commit, by the version reclaim-leader, a member-join transaction for the database node to a transaction log; and replicate, by the database node, up to the member-join transaction. The non-transitory computer-readable storage medium may also include instructions that when executed by the computer, further cause the computer to enable, by the database node, the query execution.

The details of one or more embodiments of the subject matter of this specification are set forth in the accompanying drawings and the description below. Other features, aspects, and advantages of the subject matter will become apparent from the description, the drawings, and the claims.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
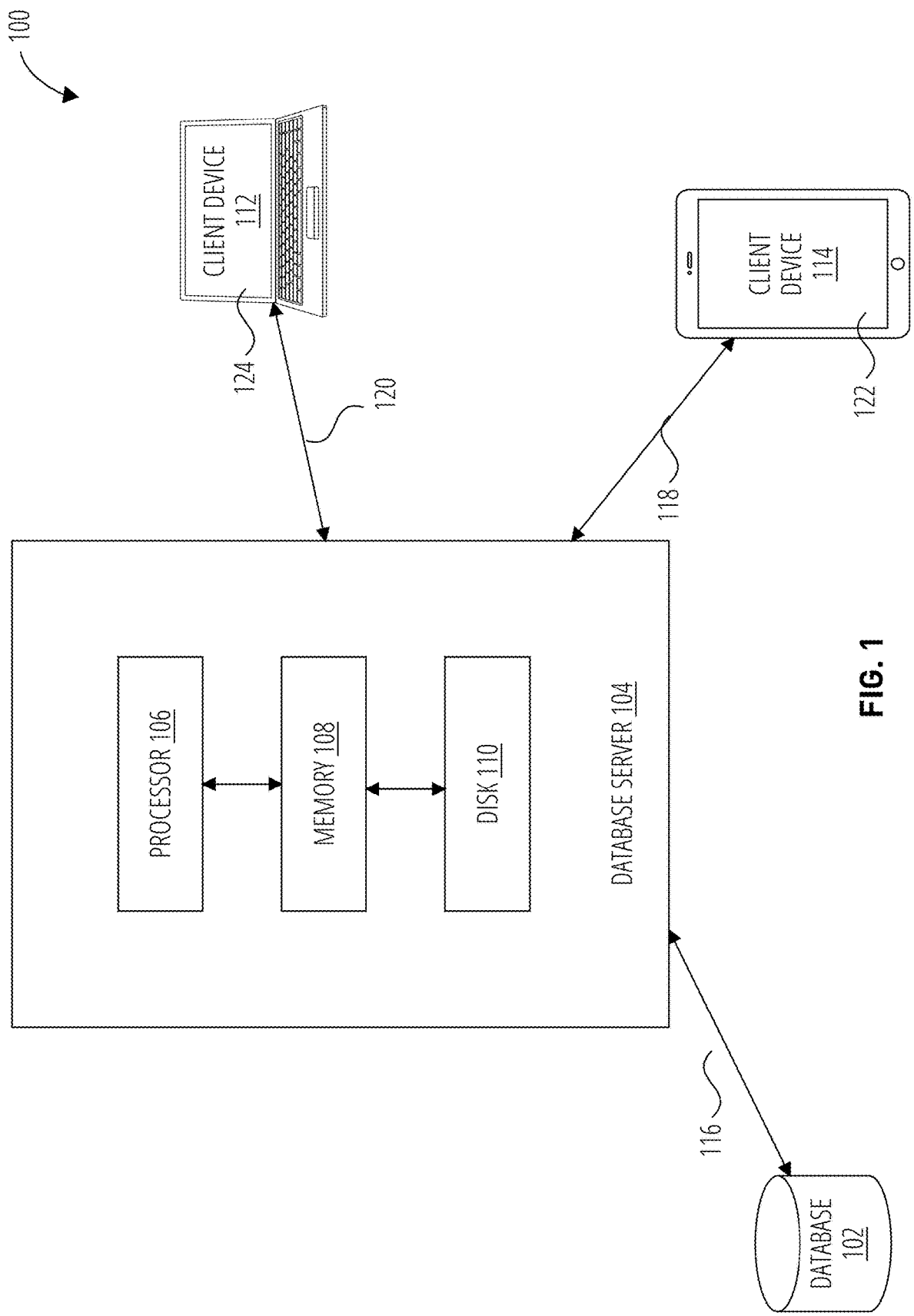
FIG. 1 illustrates an example of a system for distributed version reclaim in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user.

Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

Terminology

A "database node" refers to a processing node in a database cluster. A database node comprises CPU resources and storage.

A "version" refers to an identifier associated with a batch of database record changes.

A "version reclaim" refers to a process for cleaning up and/or compacting versions that are no longer needed, as well as cleaning/compacting their associated record changes. In some embodiments, the cleanup steps of the database can be database transactions.

"Reference counting" refers to a technique for tracking the usage of a resource, such as a version, where each tracked resource is associated with a reference count. In some embodiments, each database node uses reference counting to determine when a version is no longer in use by that database node in a database management system.

FIG. 1 illustrates an example of a system 100 for distributed version reclaim.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
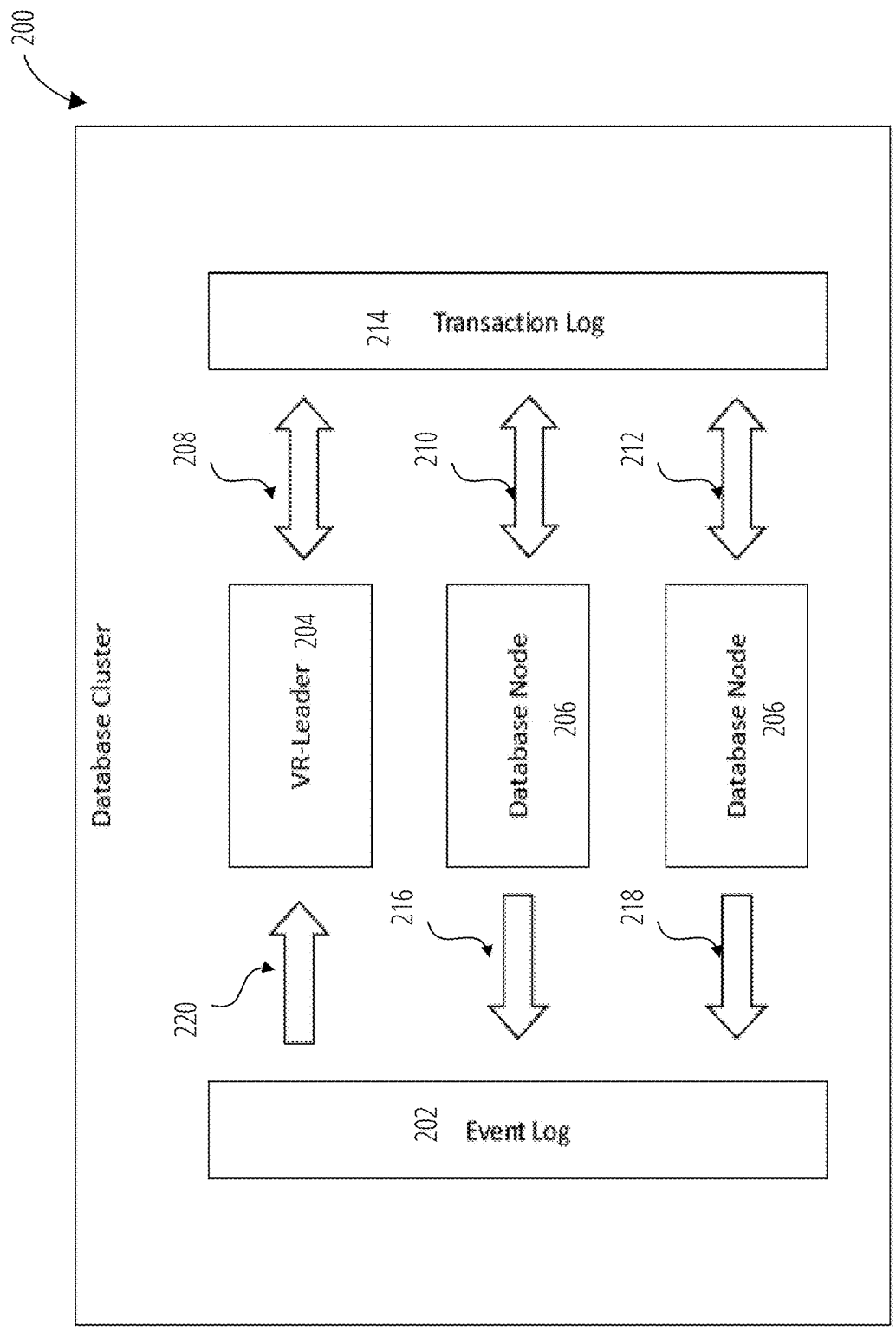
FIG. 2 illustrates a database cluster in accordance with one embodiment.

FIG. 2 illustrates a database cluster 200 in accordance with one embodiment.

A database cluster 200 is a system that comprises a VR-Leader 204; one or more database nodes 206; a Transaction Log 214; and an event log 202. While two database nodes 206 are shown in FIG. 2, it is understood there can be more than two database nodes.

The database node(s) 206 produce release events into the event log 202, as shown by the one-way arrow(s) 216 and 218. On the other hand, the VR-Leader 204 consumes release events from the event log 202, as shown by the one-way arrow 220.

The VR-Leader 204 and database node(s) 206 both produce entries into the Transaction Log 214 and consume entries from the Transaction Log 214, as shown by the two-way arrows 208, 210, and 212, respectively. The procedure for producing entries is termed "committing". The procedure for consuming is termed "replicating".

Figure 3:
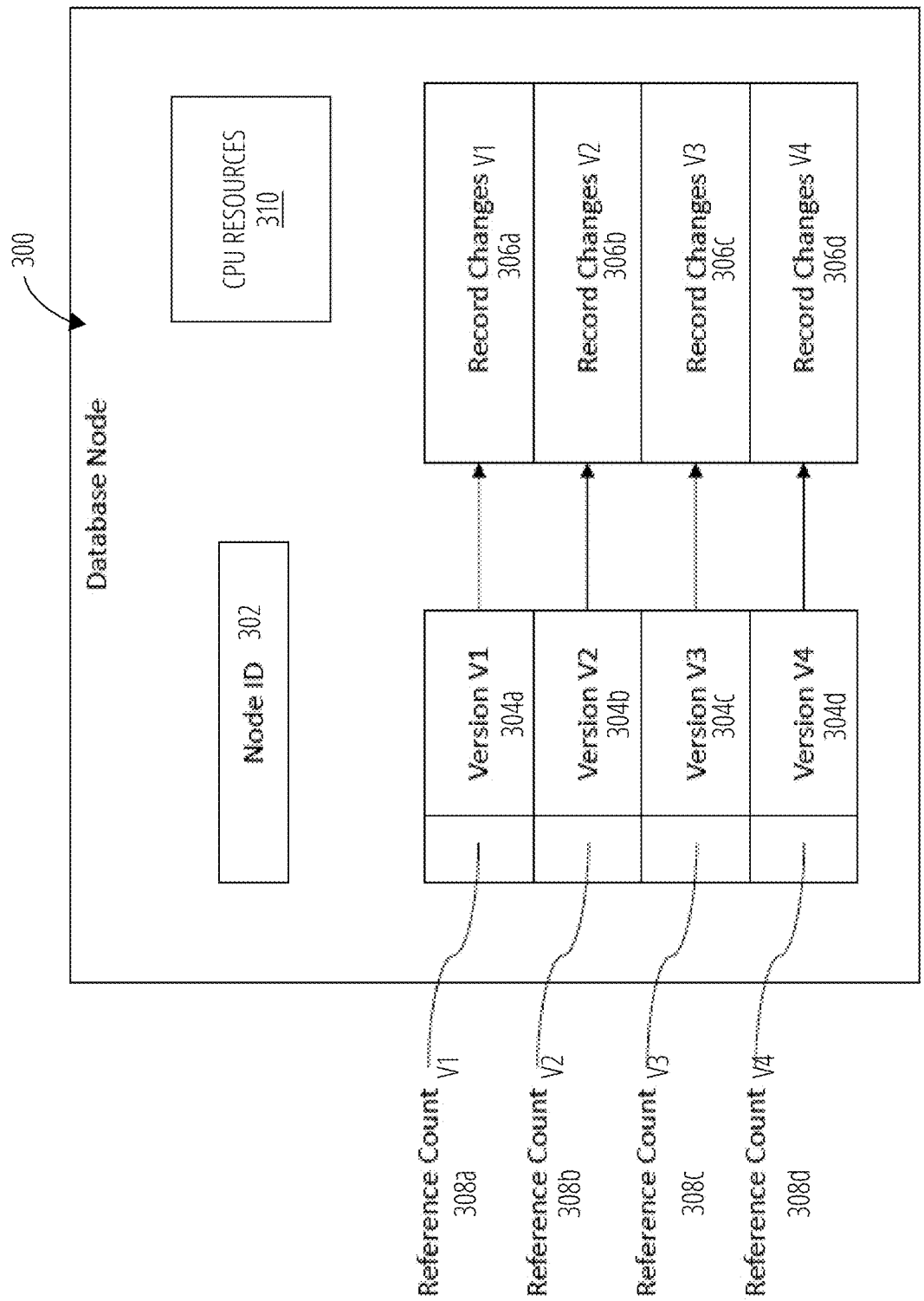
FIG. 3 illustrates a database node in accordance with one embodiment.

FIG. 3 illustrates a database node 300 in accordance with one embodiment.

In the embodiment shown in FIG. 3, the database node 300 comprises: CPU resources 310; a database node identifier (node ID 302), which is a unique identifier for the database node in the cluster; and a set of versions 304*a*, 304*b*, 304*c* and 304*d* shown respectively as Version V1, Version V2, Version V3 and Version V4. Each version 304*a*, 304*b*, 304*c* and 304*d* is respectively associated with a record change 306*a*, 306*b*, 306*c* and 306*d*. Furthermore, each version 304*a*, 304*b*, 304*c* and 304*d* is respectively associated with a reference count 308*a*, 308*b*, 308*c* and 308*d*. Each reference count is initialized to a value that is greater than zero, and is decreased to zero when the database node 300 no longer has use for the corresponding version.

Figure 4:
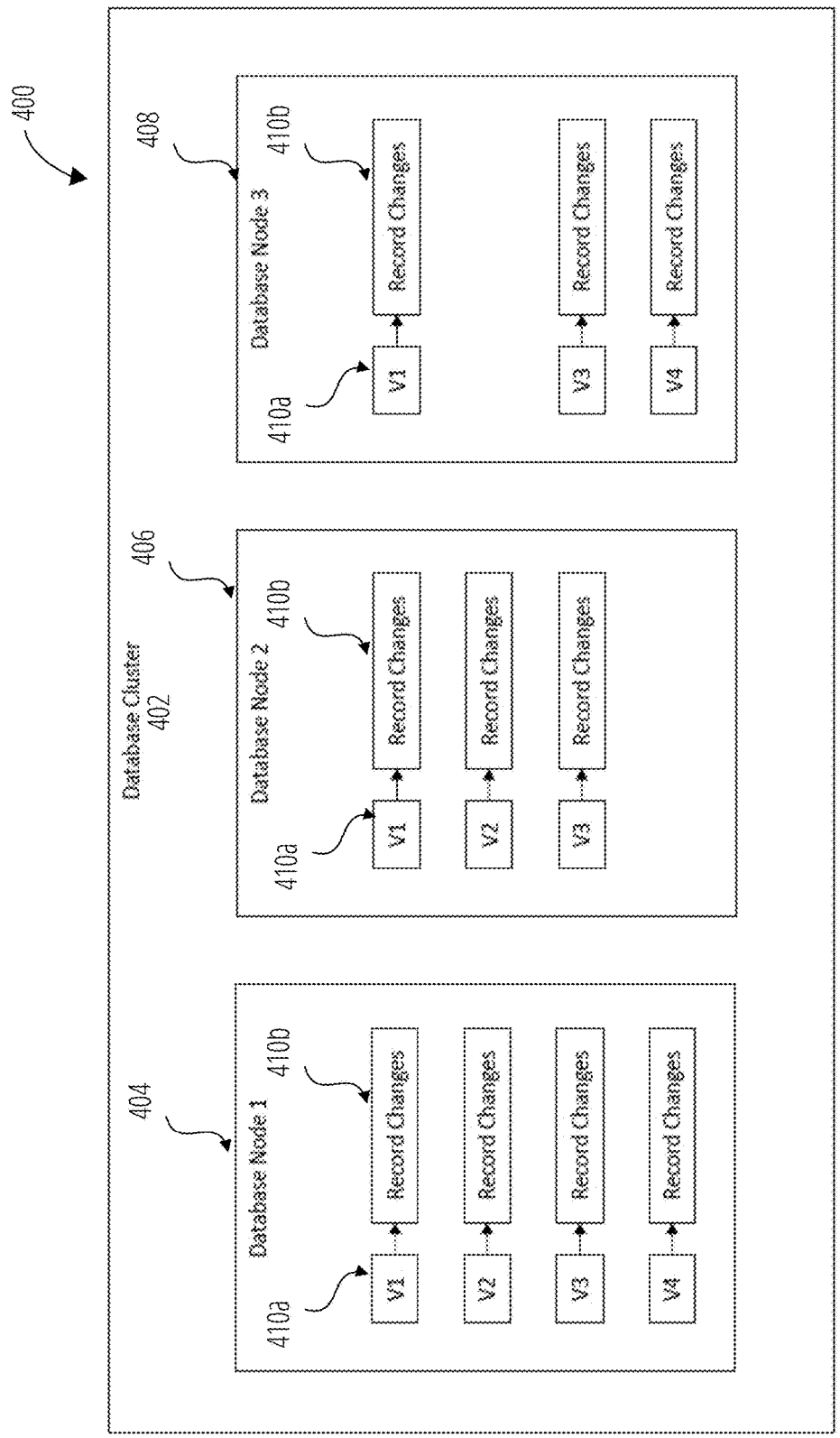
FIG. 4 illustrates an example of multiple copies of a version in accordance with one embodiment.

FIG. 4 illustrates an example of multiple copies of a version 400 in accordance with one embodiment.

In the embodiment shown in FIG. 4, there are multiple copies of a version and its associated record changes in the database cluster 402. Each database node (404, 406, 408) has a copy of a subset of all of the versions and record changes in the database. In the embodiment shown in FIG. 4, database node 1 (item 404) has a copy of four versions, V1, V2, V3 and V4, along with the corresponding record changes. Database node 2 (item 406) has a copy of three versions, V1, V2 and V3, along with the corresponding record changes. Finally, database node 3 (item 408) has a copy of three versions, V1, V3 and V4, along with the corresponding record changes. In FIG. 4, a copy of version V1 (item 410*a*) and its corresponding record change (item 410*b*) is shown in database node 1 (item 404), database node 2 (item 406) and database node 3 (item 406).

Note that the reference count for a version is not copied to multiple database nodes. Each database node (404, 406, 408) has its own private reference count.

Figure 5:
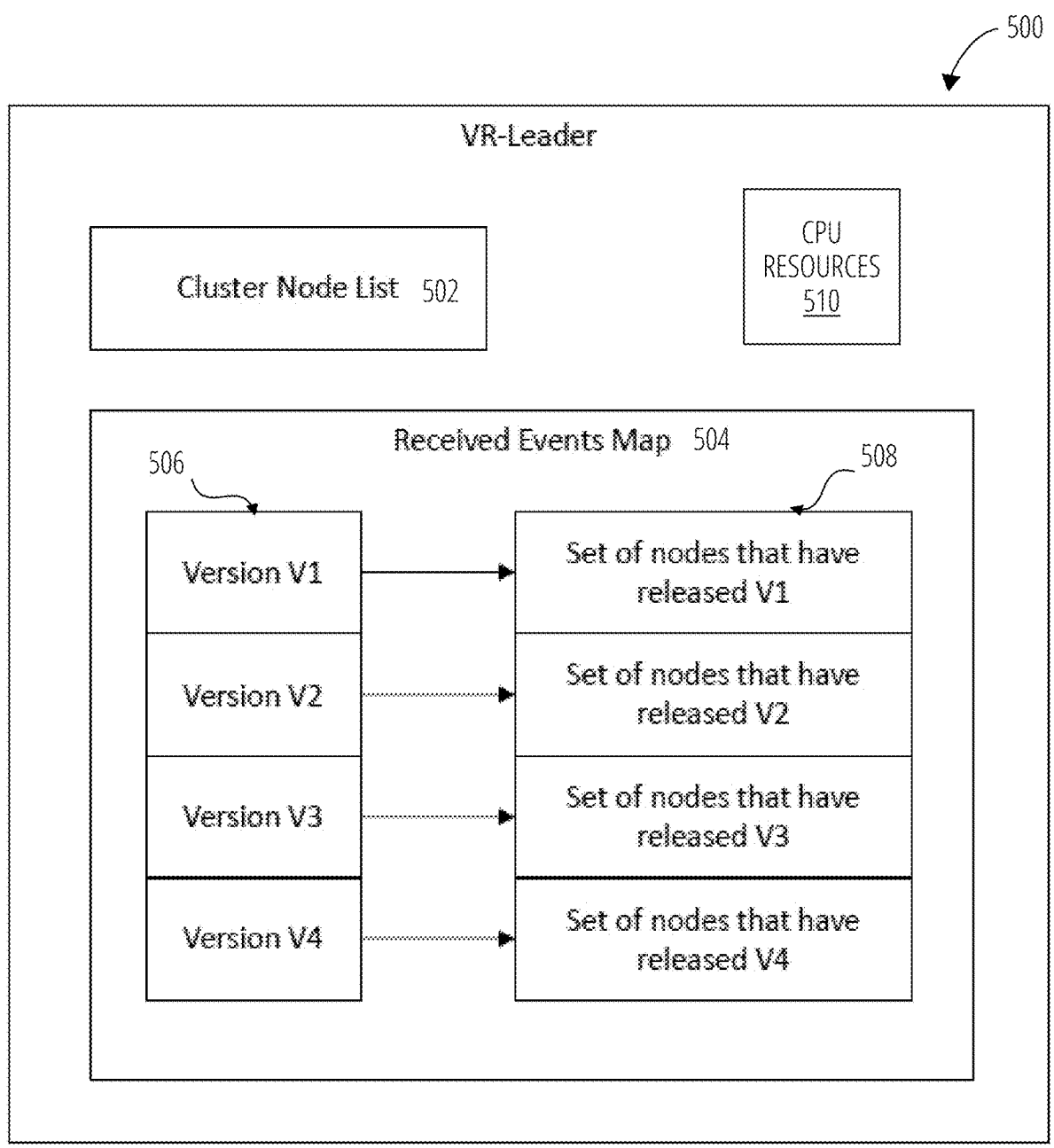
FIG. 5 illustrates a Version Reclaim-Leader (VR-Leader) in accordance with one embodiment.

FIG. 5 illustrates a VR-Leader 500 in accordance with one embodiment.

In the embodiment shown in FIG. 5, the VR-Leader 204 comprises: CPU resources 510, a cluster node list 502; and a received events map 504. Like each database node, the VR-Leader 204 also comprises CPU resources.

The cluster node list 502 is a set of the node IDs of the database nodes that are part of the database cluster. The received events map 504 tracks the release events (see FIG. 7) that have been consumed by the VR-Leader 500. The received events map 504 associates each version 506 with the corresponding set of database nodes 508 that have released the corresponding version.

The VR-Leader 500 is responsible for processing release events and generating cleanup transactions. The VR-Leader 500 commits cleanup transactions to a transaction log (see, for example, Transaction Log 214 in FIG. 2).

Figure 6:
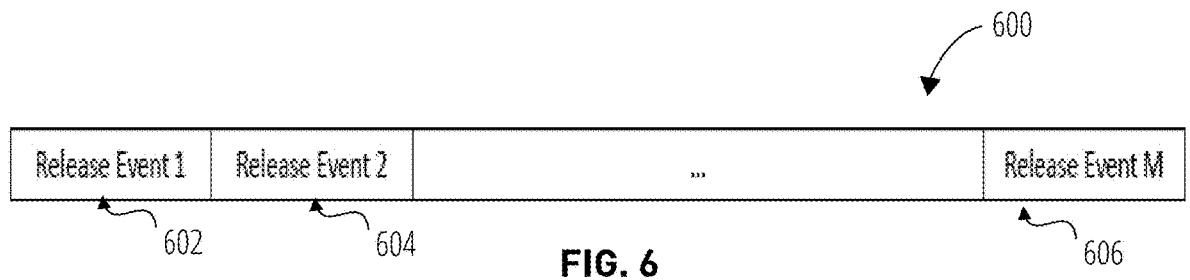
FIG. 6 illustrates an event log in accordance with one embodiment.

FIG. 6 illustrates an event log 600 in accordance with one embodiment.

The event log 600 is a sequence of release events (602, 604, 606), which are produced by one or more database nodes (for example, database nodes 206 in FIG. 2), and consumed by the VR-Leader (for example, VR-Leader 204 in FIG. 2).

Figure 7:
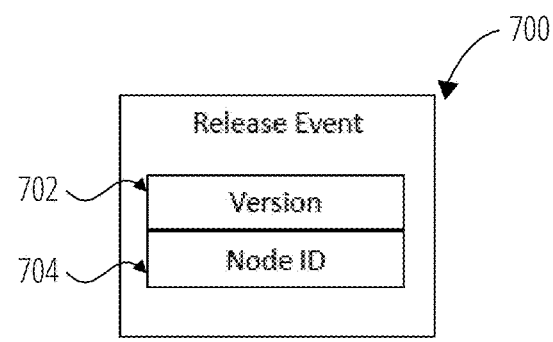
FIG. 7 illustrates a release event in accordance with one embodiment.

FIG. 7 illustrates a release event 700 in accordance with one embodiment.

A release event 700 has a payload that can include: a version 702 and a Node ID 704. As an example, a database node with node ID=DB1 sends a release event with payload (V1, DB1) to indicate that it has no further use for version V1. In other words, database node DB1 is releasing version V1.

Figure 8:
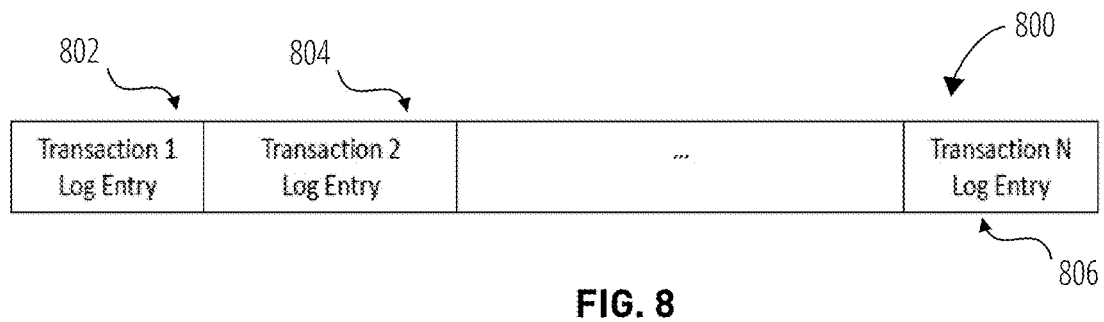
FIG. 8 illustrates a transaction log in accordance with one embodiment.

FIG. 8 illustrates a transaction log 800 in accordance with one embodiment.

The transaction log 800 comprises a sequence of transaction log entries 802, 804, 806); where each transaction log entry describes an ACID (atomic, consistent, isolated, durable) update to the database. The state of the database at a given transaction can be reconstructed by sequentially applying all preceding transactions.

Figure 9:
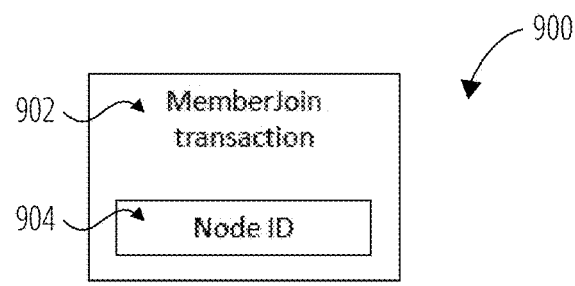
FIG. 9 illustrates a MemberJoin transaction log entry in accordance with one embodiment.

FIG. 9 illustrates a MemberJoin transaction log entry 900 in accordance with one embodiment.

A MemberJoin transaction 902 is a type of transaction. A VR-Leader commits this transaction to acknowledge that a database node has been added to the database cluster. The log entry 900 for a MemberJoin transaction comprises a Node ID 904, which is the Node ID 904 of the database node that has been added to the cluster. MemberJoin(DB1) refers to a MemberJoin transaction 902 that acknowledges that node ID=DB1 has joined the cluster.

Processes

Figure 10:
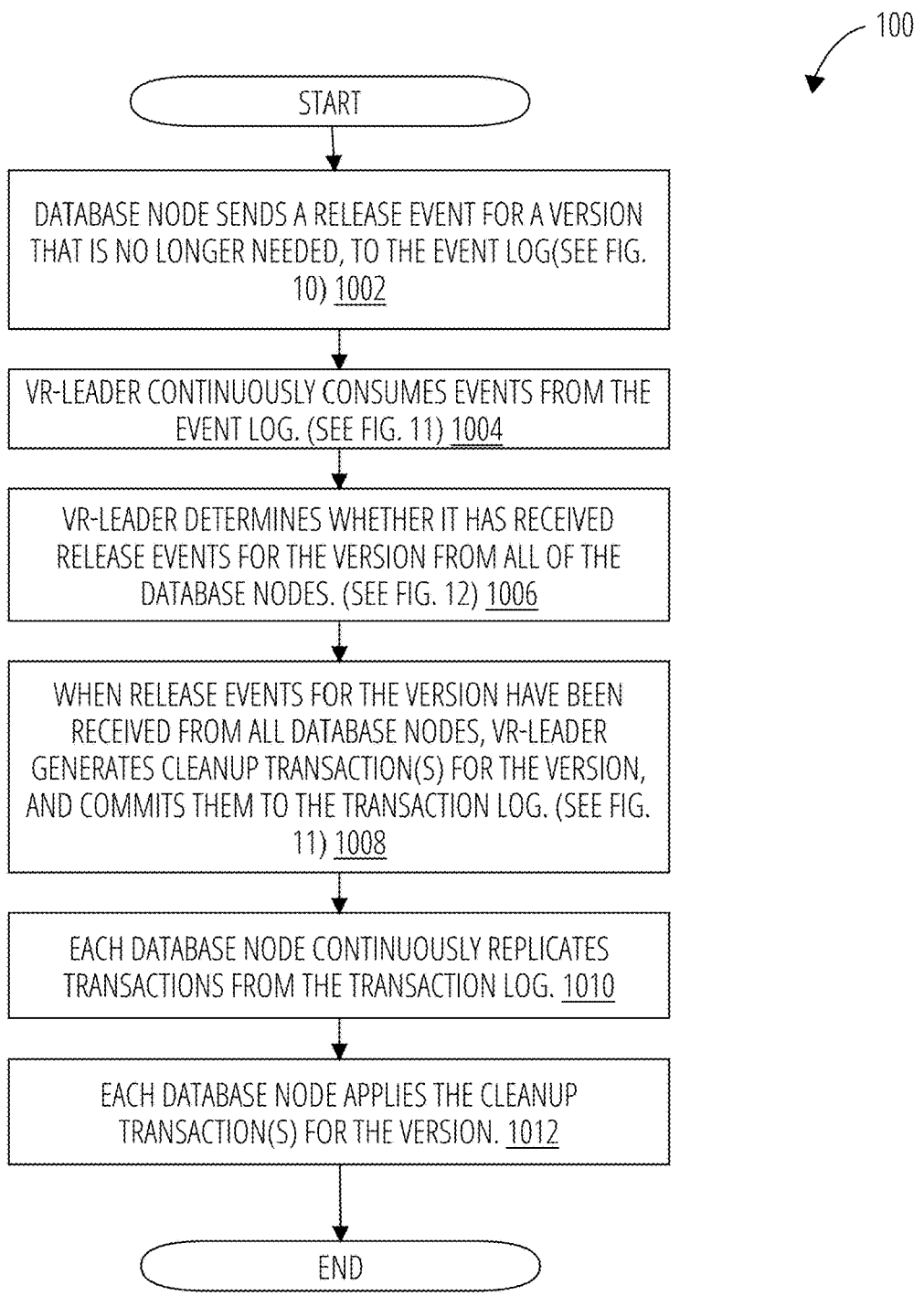
FIG. 10 illustrates a flowchart for reclaiming a version in accordance with one embodiment.

FIG. 10 illustrates a flowchart 1000 for reclaiming a version in accordance with one embodiment.

In flowchart 1000, a version is assumed to be in use, unless it is released by every database node in a cluster. Each database node maintains a private reference count for each version. At block 1002, each database node sends a release event when its private reference count reaches a value of zero (this is described in further detail below in FIG. 11). The VR-Leader then consumes the release events at block 1004 (this is described in further detail in FIG. 12). At block 1006, the VR-Leader determines that a version is free on all database nodes when it has received a release event from every database node in the database cluster (this is described in further detail in FIG. 13). When release events for the version have been received from all database nodes, the VR-Leader generates cleanup transactions and commits them to the transaction log at block 1008 (this is described in further detail in FIG. 12). Each database node continuously replicates (or consumes) transactions from the transaction log at block 1010. Finally, the database nodes apply the cleanup by replicating the cleanup transactions from the transaction log at block 1012.

Figure 11:
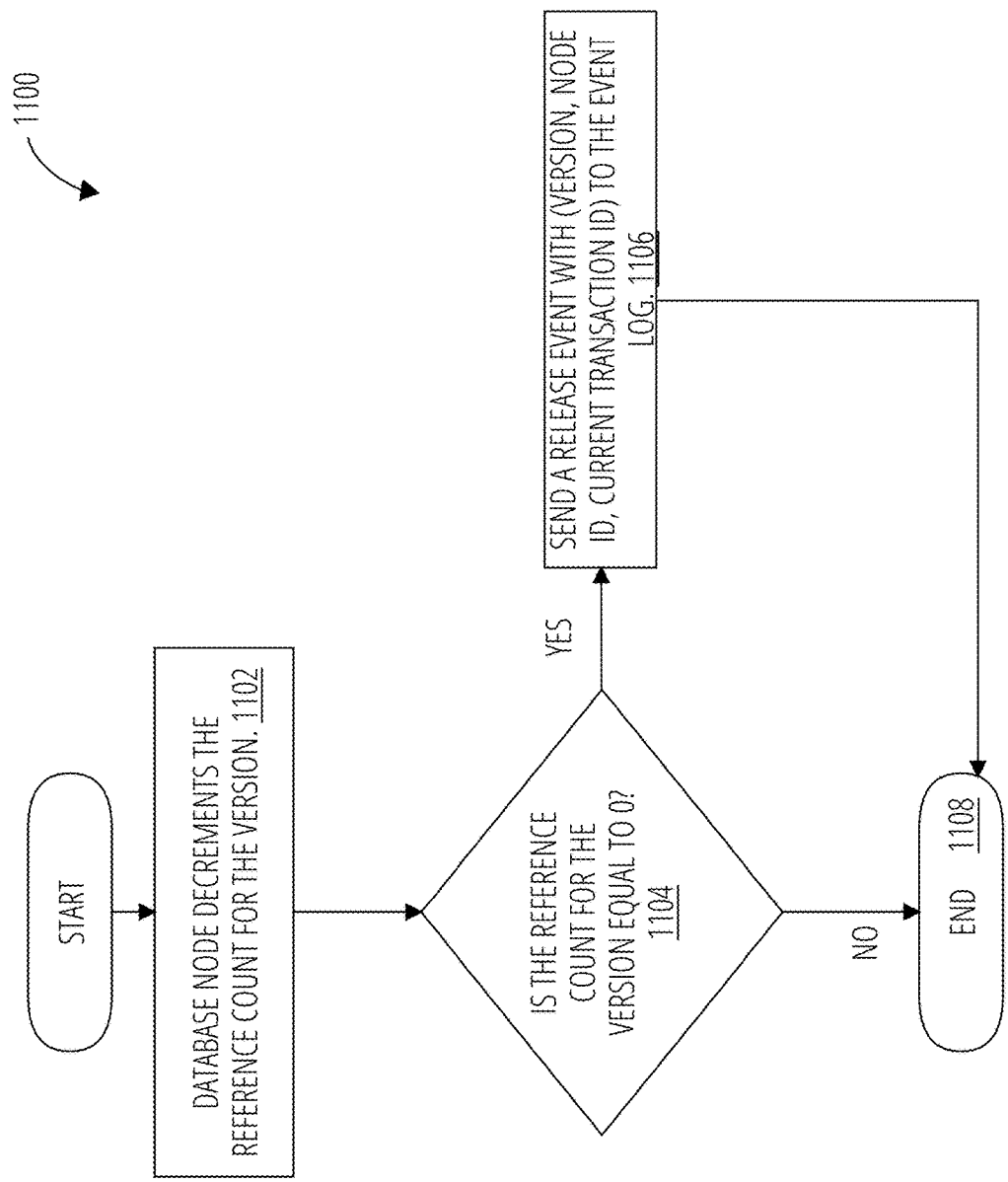
FIG. 11 illustrates a flowchart for a database node releasing a version in accordance with one embodiment.
Figure 12:
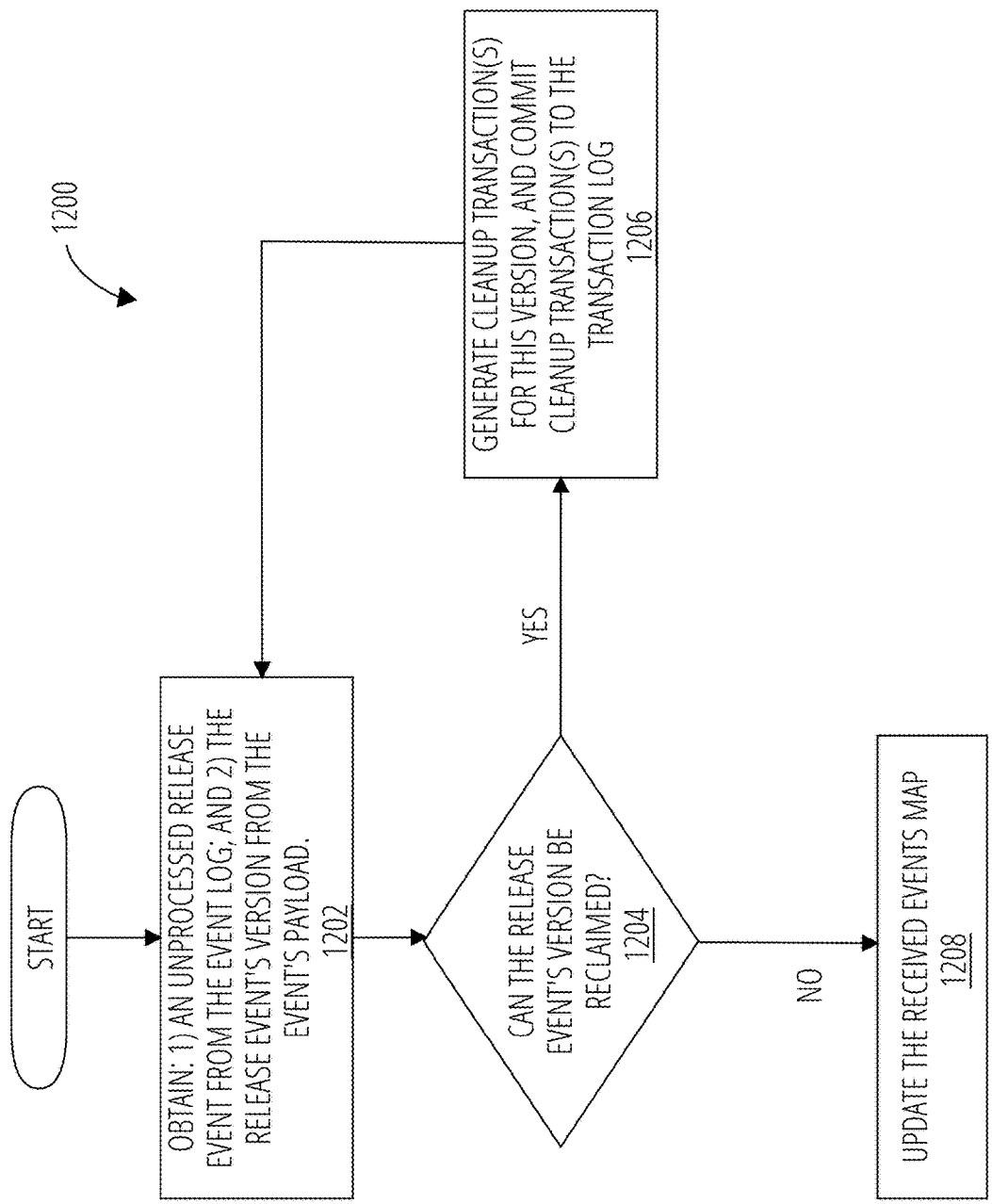
FIG. 12 illustrates a flowchart of the VR-Leader processing release events and generating version reclaim cleanup transactions in accordance with one embodiment.
Figure 13:
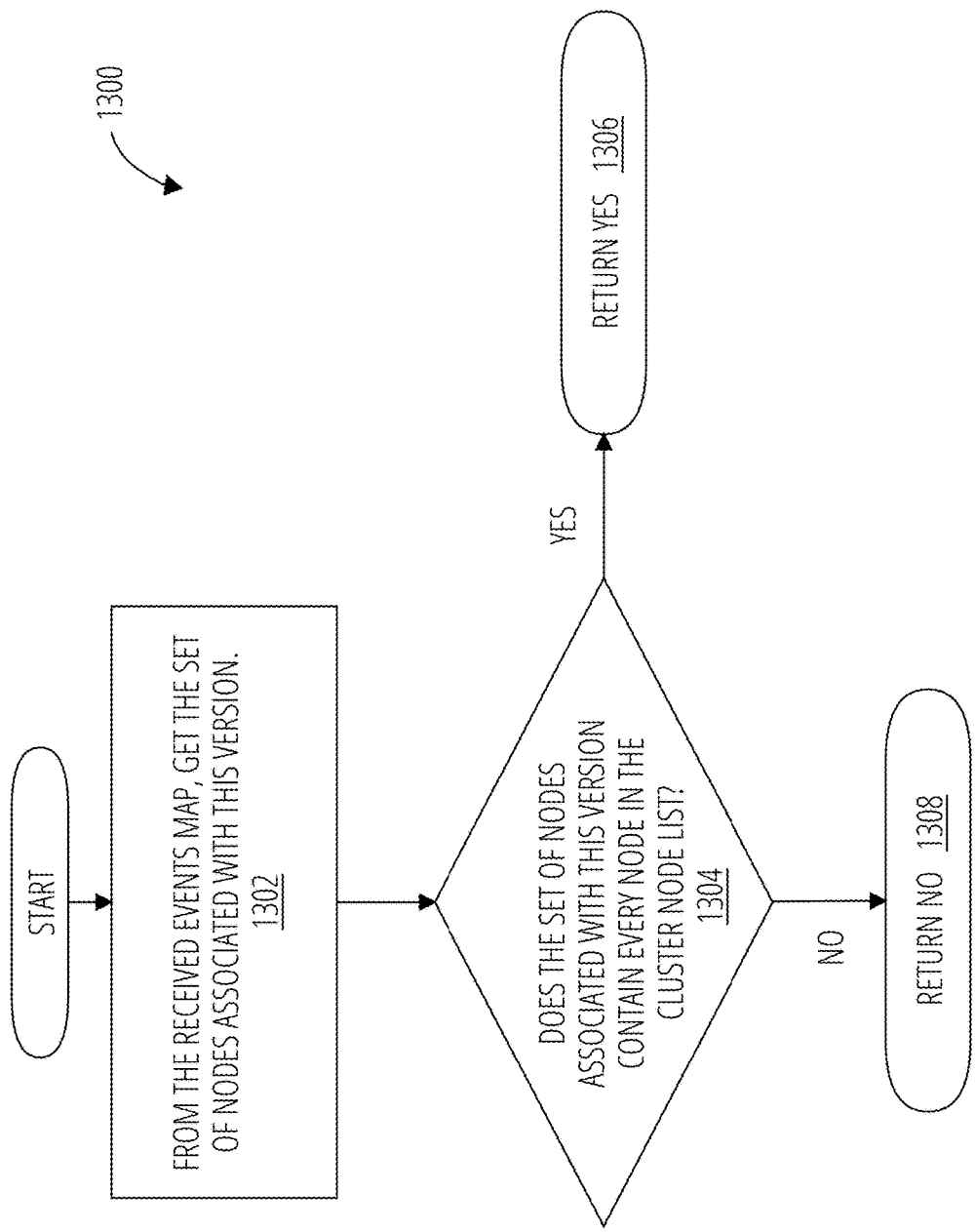
FIG. 13 illustrates a flowchart for the VR-Leader determining whether all database nodes have released a version in accordance with one embodiment.

FIG. 11-FIG. 13 provide more details about various blocks described above.

FIG. 11 illustrates a flowchart 1100 for releasing a version in accordance with one embodiment. Flowchart 1100 describes block 1002 of FIG. 10. In FIG. 10, a database node determines that it no longer needs a version.

First, at block 1102, a database node decrements the reference count for the version. If the reference count for the version is equal to '0' at decision block 1104, then a release event is sent, with (version, node id, current transaction id), to the Event Log at block 1106. If the reference count for the version does not equal '0', then the program ends at 1108.

FIG. 12 illustrates a flowchart 1200 of the VR-Leader processing release events and generating version reclaim cleanup transactions in accordance with one embodiment. Flowchart 1200 describes blocks 1004 and 1008 of FIG. 10. In FIG. 12, the VR-Leader processes release events.

First, at block 1202, an unprocessed release event is obtained by the VR-Leader from the event log, while the version is obtained from the release event's payload (see FIG. 7). If the release event's version can be reclaimed ('yes' at decision block 1204), then cleanup transaction(s) for this version are generated, and committed to the transaction log at block 1206, before returning to block 1202. If the event's version cannot be reclaimed ('no' at decision block 1204), then the received events map is updated at block 1208.

FIG. 13 illustrates a flowchart 1300 for the VR-Leader determining whether all database nodes have released a version in accordance with one embodiment. Flowchart 1300 also describes block 1006 of FIG. 10. In FIG. 13, the VR-Leader determines if a version can be reclaimed.

First, at block 1302, the set of database nodes associated with this version is obtained from the received events map. If the set of database nodes associated with this version contains every database node in the cluster node list (decision block 1304), then an answer 'yes' is returned at 1306. If the set of database nodes associated with this version does not contain every database node in the cluster node list (decision block 1304), then an answer 'no' is returned at 1308.

Figure 14:
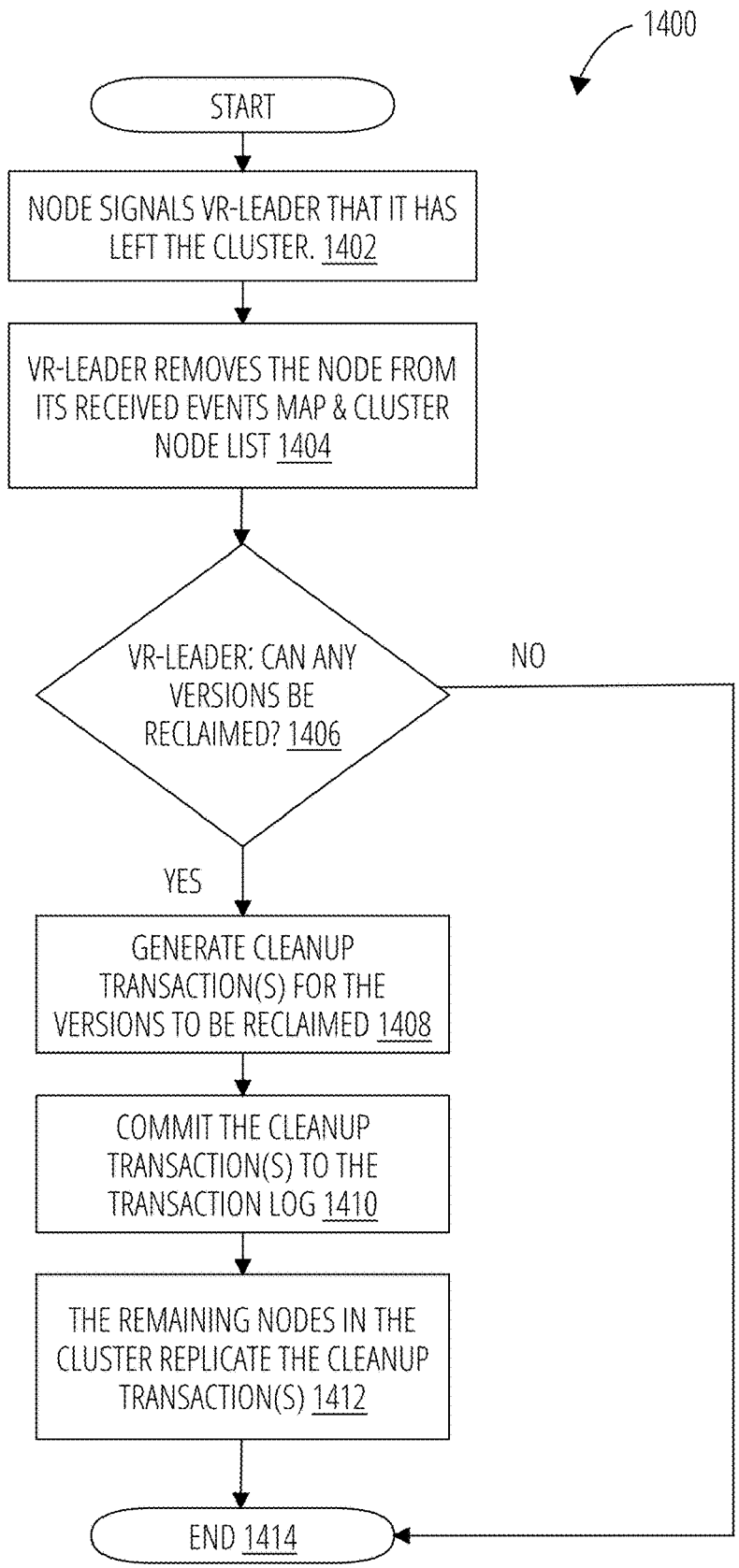
FIG. 14 illustrates a flowchart for a database node leaving a cluster in accordance with one embodiment.

FIG. 14 illustrates a flowchart 1400 for a database node leaving a cluster in accordance with one embodiment.

Figure 17:
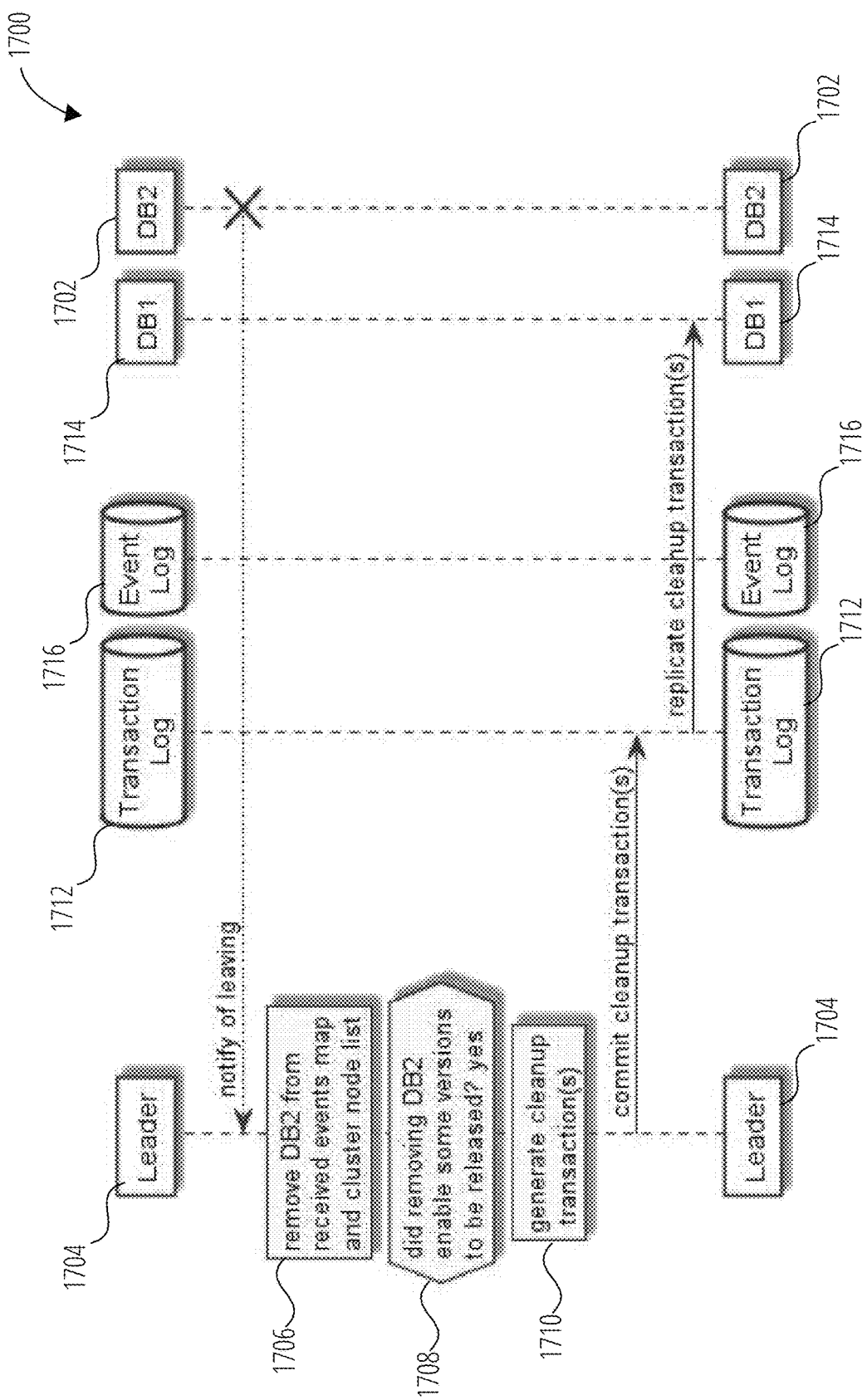
FIG. 17 illustrates an example of a database node leaving a cluster in accordance with one embodiment.

At block 1402, a database node signals a VR-Leader that it has left the cluster. The VR-Leader removes the database node from its received events map and cluster node list at block 1404. FIG. 5 illustrates an embodiment of a received events map 504 and cluster node list 502. The VR-Leader then determines if any versions can be reclaimed (decision block 1406). If not, the process ends at 1414. If yes, then cleanup transaction(s) for the versions to be reclaimed, are generated by the VR-Leader at block 1408. The cleanup transaction(s) are then committed to the transaction log at block 1410. The remaining database nodes in the cluster replicate the cleanup transaction(s) at block 1412, before the process concludes at 1414. An example of this sequence is also shown in FIG. 17.

Figure 15:
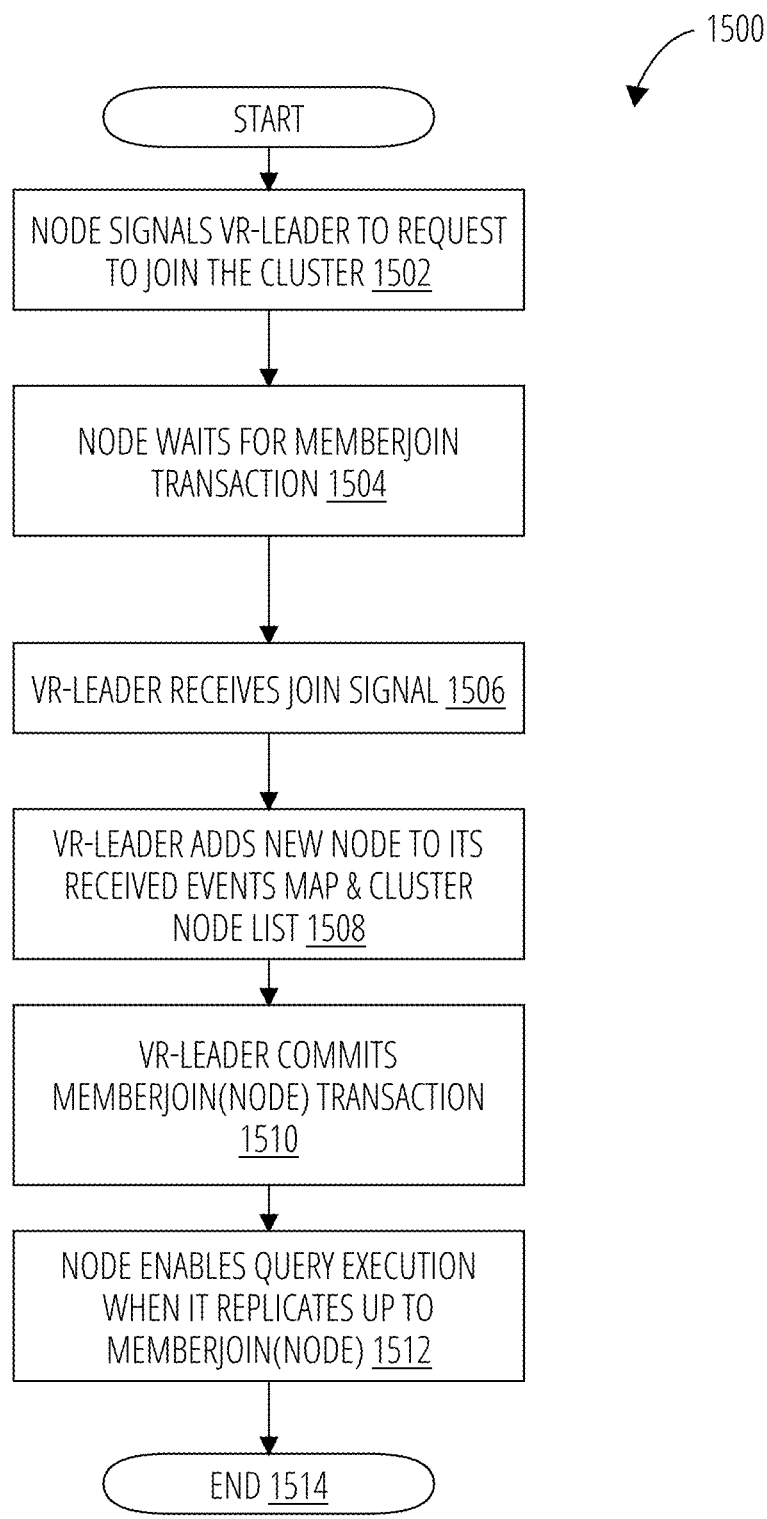
FIG. 15 illustrates a flowchart for a database node joining a cluster in accordance with one embodiment.

FIG. 15 illustrates a flowchart 1500 for a database node joining a cluster in accordance with one embodiment.

Figure 18:
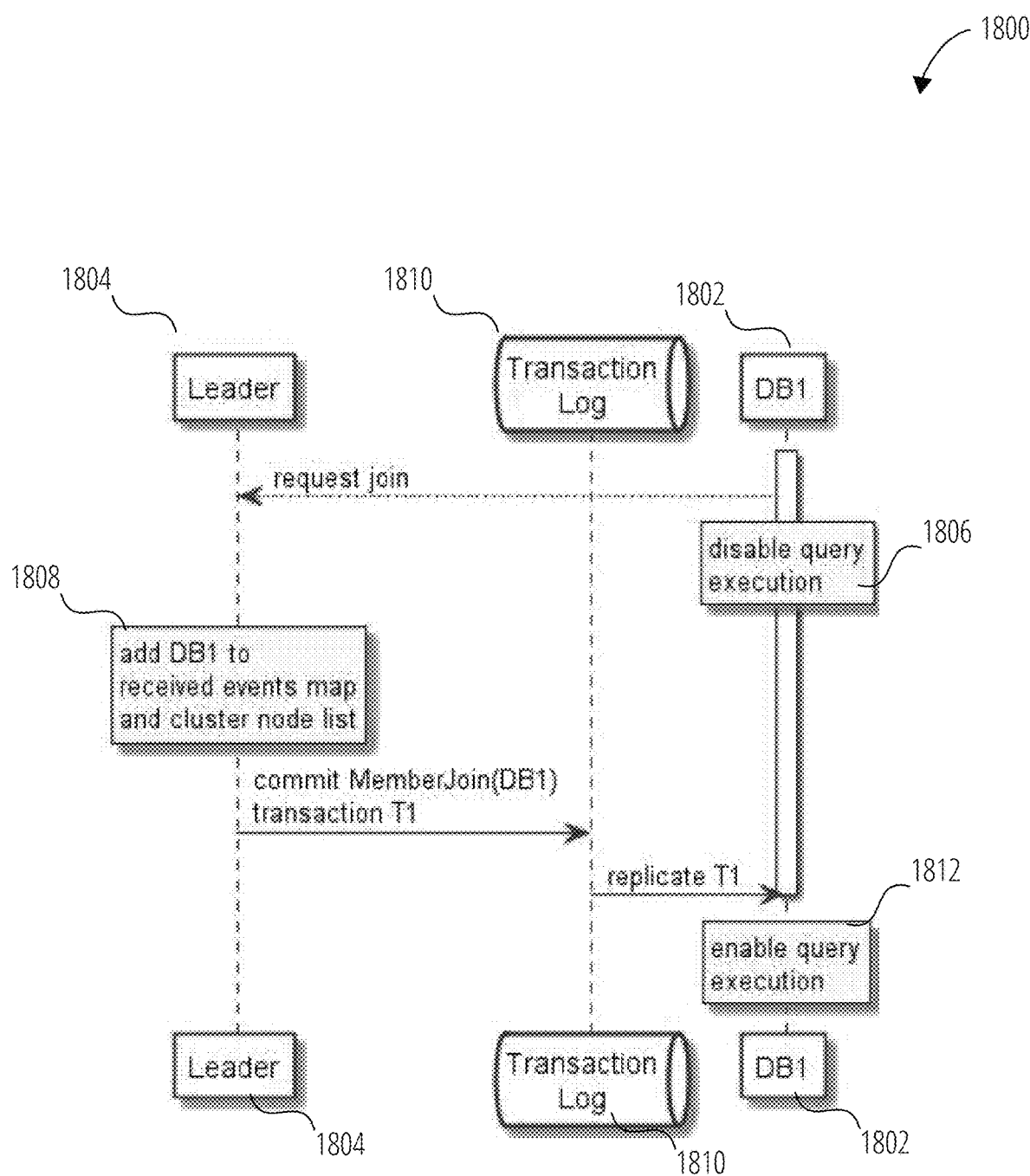
FIG. 18 illustrates an example of a database node joining a cluster in accordance with one embodiment.

At block 1502, a database node signals a VR-Leader a request to join the cluster. The database node waits for a MemberJoin transaction at block 1504. The VR-Leader receives the join signal at block 1506, At block 1508, the VR-Leader adds the new database node to its received events map and cluster node list. FIG. 5 illustrates an embodiment of a received events map 504 and cluster node list 502. At block 1510, the VR-Leader commits the MemberJoin(node) transaction to the transaction log. At block 1512, the database node enables query execution when it replicates up to MemberJoin(node), before ending the process at 1514. An example of this sequence is shown in FIG. 18.

Figure 16:
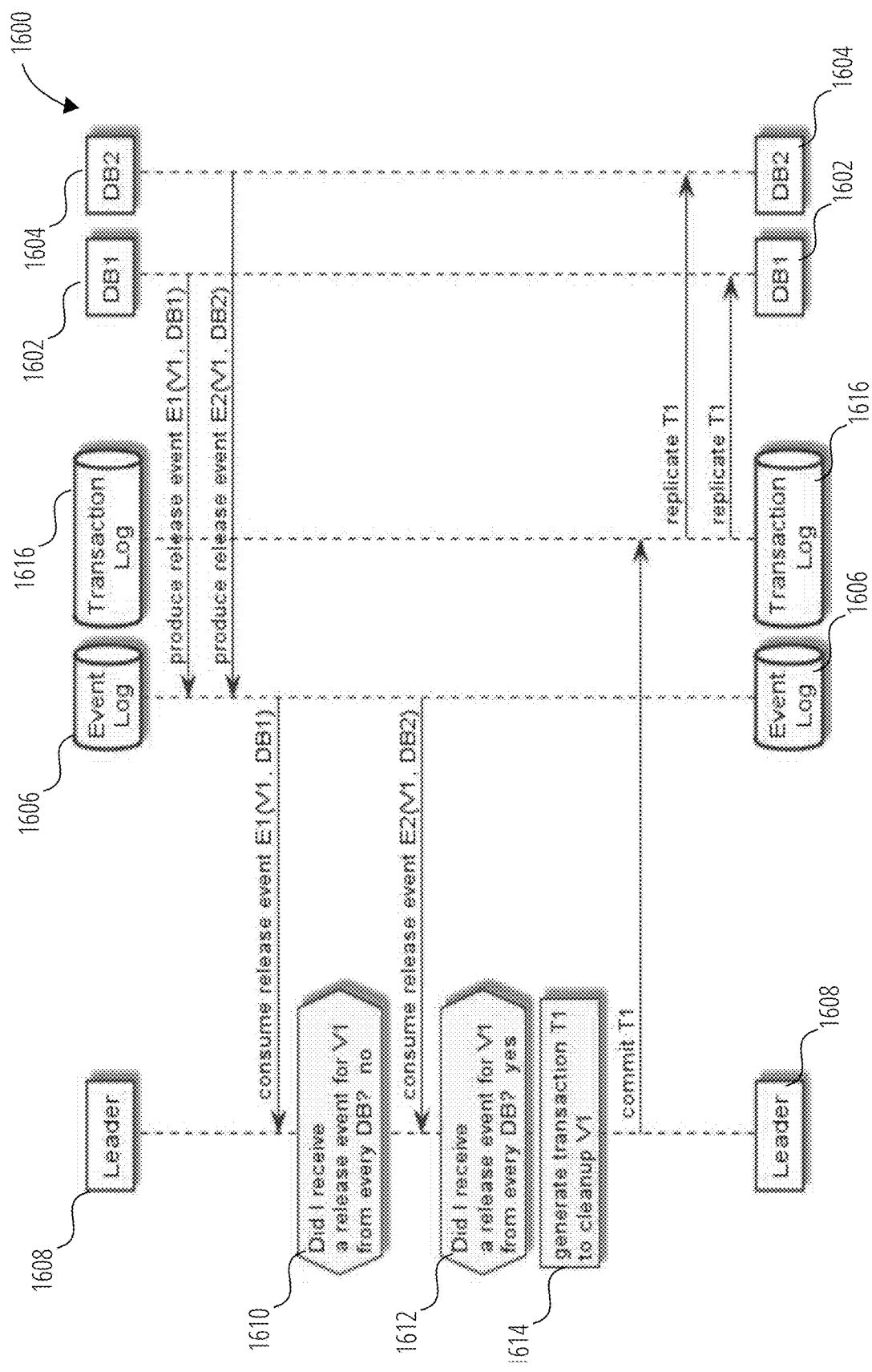
FIG. 16 illustrates an example of reclaiming a version in accordance with one embodiment.

FIG. 16 illustrates an example 1600 of reclaiming a version in accordance with one embodiment.

A first database node 1602 (with node ID=DB1) produces a release event—denoted as E1(V1, DB1)—which indicates a version number 'V1', and the first database node 1602 designation 'DB1'. This release event is sent to the Event Log 1606. Similarly, a second database node 1604 (node ID=DB2) produces a release event—denoted as E2(V1, DB2)—which indicates a version number 'V1', and second database node 1604 designation 'DB2'. This release event is also sent to the Event Log 1606.

The VR-leader 1608 consumes the release event E1(V1, DB1), and determines if a release event for V1 was received from every database node (item 1610). In the example 1600, the answer is 'no', as there is a second database node 1604 that has produced a release event E2(V1, DB2). The VR-leader 1608 then consumes release event E2(V1, DB2), and then once again determines if a release event for V1 was received from every database node (item 1612). This time, the answer is 'yes'. The VR-leader 1608 then generates a transaction T1 to clean up V1 (item 1614). The VR-leader 1608 then commits transaction T1 to the Transaction Log 1616, which then replicates transaction T1 up to each of the first database node 1602 and the second database node 1604.

FIG. 17 illustrates an example 1700 of a database node leaving a cluster in accordance with one embodiment.

In FIG. 17, second database node 1702, leaves and signals the VR-leader 1704 that it is leaving. The VR-leader 1704 then removes the database node DB2 from a received events map and a cluster node list at 1706. The VR-leader 1704 then determines if removing the database node DB2 enables some versions to be released (at 1708). Since the answer in this example is 'yes', the VR-leader 1704 generates a cleanup of transaction(s) at 1710. The VR-leader 1704 commits cleanup transaction(s) to the Transaction Log 1712, which then replicates cleanup transaction(s) to the first database node 1714. The Event Log 1716, although shown, is not called upon in this example.

FIG. 18 illustrates an example 1800 of a database node joining a cluster in accordance with one embodiment.

The database node 1802 makes a request to the VR-leader 1804 to join. Furthermore, query execution is disabled at 1806. The VR-leader 1804 then adds the new database node DB1 to a received events map and cluster node list at 1808. The VR-leader 1804 then commits MemberJoin(DB1) transaction T1 to the Transaction Log 1810. Query execution is enabled at 1812, when the database node replicates up to MemberJoin(DB1) transaction T1.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for distributed version reclaim in a database cluster comprising a plurality of database nodes, the method comprising:

sending, by each database node in response to each of said database node having decreased a respective reference count associated with a respective version to a minimum threshold, a release event to an event log, thereby producing a plurality of release events in the event log, the release event comprising a version number of the respective version and a database node identifier of the respective database node, wherein each of the respective reference count of each of the respective database node is private to the respective database node;

continuously consuming, by a version reclaim-leader, the plurality of release events from the event log;

determining, by the version reclaim-leader, whether a version has been released by each database node of the plurality of database nodes;

generating, by the version reclaim-leader, one or more cleanup transactions for the version when the version reclaim-leader determines that the version has been released by each database node;

committing, by the version reclaim-leader, the one or more cleanup transactions to a transaction log;

continuously replicating, by each database node, the one or more cleanup transactions from the transaction log; and applying, by each database node, the one or more cleanup transactions for the version.

2. The computer-implemented method of claim 1, wherein continuously consuming the plurality of release events by the version reclaim-leader comprises:

obtaining, by the version reclaim-leader, an unprocessed event from the event log; and obtaining, by the version reclaim-leader, the respective version from a payload of the unprocessed event.

3. The computer-implemented method of claim 1, wherein determining whether the version has been released by each database node of the plurality of database nodes, comprises:

obtaining, by the version reclaim-leader, a set of database nodes associated with the version from a received events map;

determining, by the version reclaim-leader, if the set of database nodes contains every database node in a cluster node list;

determining, by the version reclaim-leader, that the version has been released by each database node when the set of database nodes contains every database node in the cluster node list; and determining, by the version reclaim-leader, that the version has not been released by each database node when the set of database nodes does not contain every database node in the cluster node list, followed by:
    updating, by the version reclaim-leader, the received events map.

4. A computer-implemented method comprising:
transmitting, by a database node to a version reclaim-leader, a departure of the database node from a cluster;
decreasing, at the database node for each respective version of the database node, a corresponding reference count to a minimum threshold, the corresponding reference count being associated with a corresponding respective version of the database node;
sending, by the database node and in response to decreasing the corresponding reference count to the minimum threshold, a corresponding release event to an event log for each of the respective version of the database node;
consuming, by the version reclaim-leader, the corresponding release event from the event log for each of the respective version of the database node;
removing, by the version reclaim-leader and in response to consuming the corresponding release event for each of the respective version of the database node, the database node from a received events map and a cluster node list;
determining, by the version reclaim-leader, one or more reclaimed versions;
generating, by the version reclaim-leader, one or more cleanup transactions for the one or more reclaimed versions;
committing, by the version reclaim-leader, the one or more cleanup transactions to a transaction log; and
replicating, by one or more remaining database nodes in the cluster, the one or more cleanup transactions.

5. A system for distributed version reclaim in a database cluster comprising a plurality of database nodes, the system comprising:
a processor; and
a memory storing instructions that, when executed by the processor, configure the system to:
send, by each database node in response to each of said database node having decreased a respective reference count associated with a respective version to a minimum threshold, a release event to an event log, thereby producing a plurality of release events in the event log, the release event comprising a version number of the respective version and a database node identifier of the respective database node, wherein each of the respective reference count of each of the respective database node is private to the respective database node;
continuously consume, by a version reclaim-leader, the plurality of release events from the event log;
determine, by the version reclaim-leader, whether a version has been released by each database node of the plurality of database nodes;
generate, by the version reclaim-leader, one or more cleanup transactions for the version when the version reclaim-leader determines that the version has been released by each database node;
commit, by the version reclaim-leader, the one or more cleanup transactions to a transaction log;
continuously replicate, by each database node, the one or more cleanup transactions from the transaction log; and
apply, by each database node, the one or more cleanup transactions for the version.

6. The system of claim 5, wherein when continuously consuming the plurality of release events by the version reclaim-leader, the system is further configured to:
    obtain, by the version reclaim-leader, an unprocessed event from the event log; and
    obtain, by the version reclaim-leader, the version from a payload of the unprocessed event.

7. The system of claim 5, wherein when determining whether the version has been released by each database node of the plurality of database nodes, the system is further configured to:
    obtain, by the version reclaim-leader, a set of database nodes associated with the version from a received events map;
    determine, by the version reclaim-leader, if the set of database nodes contains every database node in a cluster node list;
    determine, by the version reclaim-leader, that the version has been released by each database node when the set of database nodes contains every database node in the cluster node list; and
    determine, by the version reclaim-leader, that the version has not been released by each database node when the set of database nodes does not contain every database node in the cluster node list, and update, by the version reclaim-leader, the received events map.

8. A system comprising:
a processor; and
a memory storing instructions that, when executed by the processor, configure the system to:
transmit, by a database node to a version reclaim-leader, a departure of the database node from a cluster;
decrease, at the database node for each respective version of the database node, a corresponding reference count to a minimum threshold, the corresponding reference count being associated with a corresponding respective version of the database node;
send, by the database node and in response to decreasing the corresponding reference count to the minimum threshold, a corresponding release event to an event log for each of the respective version of the database node;
consume, by the version reclaim-leader, the corresponding release event from the event log for each of the respective version of the database node;
remove, by the version reclaim-leader and in response to consuming the corresponding release event for each of the respective version of the database node, the database node from a received events map and a cluster node list;
determine, by the version reclaim-leader, one or more reclaimed versions;
generate, by the version reclaim-leader, one or more cleanup transactions for the one or more reclaimed versions;
commit, by the version reclaim-leader, the one or more cleanup transactions to a transaction log; and
replicate, by one or more remaining database nodes in the cluster, the one or more cleanup transactions.

9. A non-transitory computer-readable storage medium for distributed version reclaim in a database cluster comprising a plurality of database nodes, the computer-readable storage medium including instructions that when executed by a computer, cause the computer to:
    send, by each database node in response to each of said database node having decreased a respective reference count associated with a respective version to a minimum threshold, a release event to an event log, thereby producing a plurality of release events in the event log, the release event comprising a version number of the respective version and a database node identifier of the respective database node, wherein each of the respective reference count of each of the respective database node is private to the respective database node;

continuously consume, by a version reclaim-leader, the plurality of release events from the event log;

determine, by the version reclaim-leader, whether a version has been released by each database node of the plurality of database nodes;

generate, by the version reclaim-leader, one or more cleanup transactions for the version when the version reclaim-leader determines that the version has been released by each database node;

commit, by the version reclaim-leader, the one or more cleanup transactions to a transaction log;

continuously replicate, by each database node, the one or more cleanup transactions from the transaction log; and apply, by each database node, the one or more cleanup transactions for the version.

10. The non-transitory computer-readable storage medium of claim 9, wherein when continuously consuming the plurality of release events by the version reclaim-leader, the computer-readable storage medium including instructions that when executed by the computer, further cause the computer to:

obtain, by the version reclaim-leader, an unprocessed event from the event log; and obtain, by the version reclaim-leader, the version from a payload of the unprocessed event.

11. The non-transitory computer-readable storage medium of claim 9, wherein when determining whether the version has been released by each database node of the plurality of database nodes, the computer-readable storage medium including instructions that when executed by the computer, further cause the computer to:

obtain, by the version reclaim-leader, a set of database nodes associated with the version from a received events map; and determine, by the version reclaim-leader, if the set of database nodes contains every database node in a cluster node list;

determine, by the version reclaim-leader, that the version has been released by each database node when the set of database nodes contains every database node in the cluster node list; and determine, by the version reclaim-leader, that the version has not been released by each database node when the set of database nodes does not contain every database node in the cluster node list, and update, by the version reclaim-leader, the received events map.

12. A non-transitory computer-readable storage medium, the computer-readable storage medium including instructions that when executed by a computer, cause the computer to:

transmit, by a database node to a version reclaim-leader, a departure of the database node from a cluster;

decrease, at the database node for each respective version of the database node, a corresponding reference count to a minimum threshold, the corresponding reference count being associated with a corresponding respective version of the database node;

send, by the database node and in response to decreasing the corresponding reference count to the minimum threshold, a corresponding release event to an event log for each of the respective version of the database node;

consume, by the version reclaim-leader, the corresponding release event from the event log for each of the respective version of the database node;

remove, by the version reclaim-leader and in response to consuming the corresponding release event for each of the respective version of the database node, the database node from a received events map and a cluster node list;

determine, by the version reclaim-leader, one or more reclaimed versions;

generate, by the version reclaim-leader, one or more cleanup transactions for the one or more reclaimed versions;

commit, by the version reclaim-leader, the one or more cleanup transactions to a transaction log; and replicate, by one or more remaining database nodes in the cluster, the one or more cleanup transactions.

\* \* \* \* \*